United States Patent [19]
Wilson et al.

[11] Patent Number: 5,499,341
[45] Date of Patent: Mar. 12, 1996

[54] HIGH PERFORMANCE IMAGE STORAGE AND DISTRIBUTION APPARATUS HAVING COMPUTER BUS, HIGH SPEED BUS, ETHERNET INTERFACE, FDDI INTERFACE, I/O CARD, DISTRIBUTION CARD, AND STORAGE UNITS

[75] Inventors: Dennis L. Wilson, Palo Alto; Patrick W. O'Connor, Sunnyvale, both of Calif.

[73] Assignee: Loral Aerospace Corp., New York, N.Y.

[21] Appl. No.: 279,995

[22] Filed: Jul. 25, 1994

[51] Int. Cl.⁶ ............................. G06F 13/12; G06F 13/14
[52] U.S. Cl. ........................... 395/200.03; 395/200.02; 395/200.08; 395/822; 395/872; 395/894; 364/232.91; 364/236.2; 364/238.3; 364/DIG. 1; 364/240.2; 364/242.95; 364/245.6; 364/DIG. 7
[58] Field of Search ................................... 395/200, 325, 395/200.02, 200.03, 200.08, 822, 872, 894; 370/85.1; 371/10.1

[56] References Cited

U.S. PATENT DOCUMENTS

| | | | |
|---|---|---|---|
| 5,043,981 | 8/1991 | Firoozmand et al. | 370/85.1 |
| 5,163,131 | 11/1992 | Row et al. | 395/200 |
| 5,237,658 | 8/1993 | Walker et al. | 395/200 |
| 5,345,565 | 9/1994 | Jibbe et al. | 395/325 |
| 5,402,428 | 3/1995 | Kakuta et al. | 371/10.1 |

Primary Examiner—Thomas C. Lee
Assistant Examiner—Le Hien Luu
Attorney, Agent, or Firm—Kenneth W. Float; Anthony W. Karambelas

[57] ABSTRACT

Apparatus that provides working storage for large image and data processing systems. The apparatus comprises a computer bus, a high speed backplane bus, a local area network, a central processing unit coupled to the computer bus, an Ethernet local area network interface coupled between the computer bus and the local area network, a plurality of bidirectional input/output interface cards coupled to the computer bus and the backplane bus, and a plurality of disk modules coupled to the computer bus and the high speed backplane bus. Each interface card comprises a plurality of bidirectional input/output ports coupled to a plurality of user workstations, a fiber optic interface, and a FIFO buffer. Each disk module comprises a plurality of storage units, one of which provides for storage of parity bits and the remainder of which provides for storage of data, and a distribution card coupled to the plurality of storage units. Each distribution card comprises a controller, a double buffer, and an error correction circuit coupled between the double buffer and the plurality of storage units. The present invention permits the input/output cards to interact with more than one disk module. The apparatus uses high speed fiber optic interfaces as a standard interface, providing high performance distribution over a large area.

10 Claims, 2 Drawing Sheets

HIGH PERFORMANCE IMAGE STORAGE AND DISTRIBUTION APPARATUS HAVING COMPUTER BUS, HIGH SPEED BUS, ETHERNET INTERFACE, FDDI INTERFACE, I/O CARD, DISTRIBUTION CARD, AND STORAGE UNITS

BACKGROUND

The present invention relates generally to imaging, and more particularly, to image storage and distribution apparatus and methods for use in storing and distributing large image data files that require special handling to provide for high performance.

The assignee of the present invention has developed a working storage unit that comprises an array of 39 disks including one hot spare for a total of 40 disks. The unit is unique because of its built-in distribution. The working storage unit has 28 ports arranged in pairs. Each pair of ports is either an input pair or an output pair. The working storage unit includes a control computer that processes requests for services, including input or output of data files.

The working storage unit is a complex unit. FIG. 1 shows the basic structure for the working storage unit. The computer and the printed circuit cards of the working storage unit are connected to a VME backplane for control of the operation of the working storage unit. The interface to the disks of the working storage unit is a set of "distribution" cards, one card for each pair of disk shelves, with 5 disks per disk shelf. There are support cards for the working storage unit. An Ethernet card is used for the command interface. A monitor card checks voltage ranges on power supplies and temperature at a number of points through out the working storage unit. A VME interface card provides the direct control of the data flow through the distribution cards under the direction of the CPU.

The result of this complexity is that the working storage unit is expensive. Each working storage unit has two chassis of printed circuit cards. One chassis holds the CPU, the Ethernet LAN interfaces, the CPU memory card, and the monitor card. A second chassis holds the four distribution cards and the input and output cards.

In addition to the CPU, memory, and Ethernet LAN cards, the working storage unit has five different types of cards. This multiplicity of different types of cards increase the complexity of the working storage unit. Two of the most complex cards are the input and the output cards. These cards also are the most numerous in the working storage unit when there are a large number of connections to the working storage unit.

The input and output cards in the working storage unit perform buffering and error correction for the working storage unit. Each input word is placed in a buffer memory organized into 32 data bits with 7 bits of error correction. The error correction bits are added to the data as it is written to the buffer. The buffer is used as a large FIFO for the transfer of data to and from the disks through the distribution cards. The organization of the error correction is fixed. As a consequence, the current structure of the working storage unit is not flexible; 39 data disks are required. The only way to build a small working storage unit is to use disks with a low capacity. These disks are less expensive, but are only one part of the cost of the working storage unit.

Prior art relating to the present invention will now be discussed. U.S. Pat. No 5,124,987 issued to Milligan et al. describes to a RAID 5 (Redundant Array of Independent Disks) storage unit. This RAID technique requires a read-modify-write cycle to enter data into the storage unit. As a consequence, the write cycle is much longer than it needs to be. One difference between the present invention and this approach is in the number of ports to the storage. The Milligan et al. approach provides one or two ports, while the approach of the present invention supports several hundred connections to the storage unit.

U.S. Pat. No. 5,146,588 issued to Crater et al. is another approach for implementing a RAID 5 storage unit. Again there is only one port to enter or retrieve data.

U.S. Pat. No. 5,155,835 issued to Belsan is yet another RAID 5 storage unit. This storage unit integrates the free space directory and provides a port to a tape archive. This approach supports one or several connections to host computers. The host computers provide the communication to the users. The host computers also are a severe bottleneck, reducing data throughput that can be attained.

U.S. Pat. No. 4,831,523 issued to Lewis et al. discloses a scheme for distributing the flow of data to peripherals connected to a host computer bus. The scheme proposes a tightly coupled connection to the host bus using a direct memory access (DMA) technique enhanced by checking the peripherals for traffic and moving the data in 4 byte increments. The scheme distributes the data flow over all of the peripherals. The present invention is directed at connecting one peripheral storage unit to many user workstations.

U.S. Pat. No. 4,899,342 issued to Potter et al. uses a RAID 2 technique with a hot spare. The RAID 2 technique writes a storage word plus error correction bits across a number of disks. When one disk fails, the new data is routed automatically to the hot spare. This technique may be used in one of the disk modules of the present invention, as can the schemes of the other cited patents outlined above.

U.S. Pat. Nos. 4,817,035 and 4,849,929 issued to Timsit disclose a RAID 2 technique including track buffers for read ahead, and write ahead. This technique could improve the performance of one of the disk modules of the present invention. This scheme provides the typical one port connection to the storage.

U.S. Pat. Nos. 4,989,205 and 4,989,206 issued to Dunphy, Jr., et al. disclose a RAID 3 scheme with the disks organized into at least two groups. Spare disks are organized into a pool. Each spare disk can be allocated to any of the groups and the data reconstructed on the spare disk. The result is a higher reliability system. There is only one port provided to the storage unit. This approach may be used in a disk module of the present invention.

U.S. Pat. No. 5,077,736 issued to Dunphy, Jr. et al. discloses a one port RAID 3 scheme. The RAID 3 unit has been arranged in groups. Presumably the allocation of spare disks to any module can be used as in the previous Dunphy patents. This patent provides for different sized modules for different applications. Each module may be used to store a particular kind of data. The modules may be used together to support higher data rates. This scheme has some of the same objectives as the present invention in that the modules can be used together and separately. However, this approach has only one port and is not organized to effectively support multiple ports.

U.S. Pat. No. 5,146,574 issued to Gajjar et al. discloses a technique for segmenting a data file and storing each segment on a different storage media. The technique is similar to RAID 0 and does increase the effective throughput to storage. The scheme is a tightly coupled scheme, tying the storage more closely to the CPU and requiring the CPU to organize the storage more directly. The CPU or its surrogate must generate a list of segment identifiers for each storage module. The data is placed on the bus to the storage modules with the segment identifier. The storage module that is responsible for that segment picks the segment off the bus and stores it. On retrieval the segment identifiers permit the system to reorder the segments into the same order that they started with, reconstructing the file. This scheme has one port to the computer and is in general very different from the present invention.

Therefore it is an objective of the present invention to provide for a modular working storage unit the improves upon the existing working storage unit design.

SUMMARY OF THE INVENTION

In order to meet the above and other objectives, the present invention is a modular working storage unit that comprises a computer bus, such as a VME bus, for example, a high speed backplane bus, a local area network, a central processing unit coupled to the computer bus, an Ethernet local area network interface coupled between the computer bus and the local area network, a plurality of bidirectional input/output interface cards coupled to the computer bus and the high speed backplane bus, and a plurality of disk modules coupled to the computer bus and the high speed backplane bus.

Each bidirectional input/output interface cards comprises a plurality of bidirectional input/output ports that are respectively coupled to a plurality of user workstations, a fiber optic interface, and a FIFO buffer. Each disk module comprises a plurality of storage units, one of which provides for storage of parity bits and the remainder of which provides for storage of data organized in a RAID 3 structure, and a distribution card coupled to the plurality of storage units. Each distribution card comprises a plurality of input/output ports, a controller coupled to the computer bus through a first input/output ports, a double buffer coupled to the high speed backplane bus through a second input/output port, and an error correction circuit coupled between the double buffer and the plurality of storage units.

The above-cited patents generally are techniques for constructing disk storage modules with one or a few ports. They do not attack the problem of effectively providing simultaneous access to the storage from many different workstations. The present invention provides a high speed internal bus able to support the aggregate data rate for all of the workstations. The internal bus has slower speed ports connected to the workstations that are able to support hundreds of workstations better than if the disks were local to the workstation. The high performance is achieved using disks in modules with the data spread across the modules. The present invention organizes the data flow such that the complex elements are associated with the relatively few interfaces to the disk modules. The multiplicity of interfaces to the workstations are kept very simple since there are many of them.

The present invention provides for a modular storage and distribution system. Many conventional storage units have one basic output. The present invention attaches the storage units to many different ports. The workstation or other device connected to any one of the ports is to be able to use the storage units as though that workstation is the only device connected to the system.

The present invention is a storage system wherein complex buffers are located on disk interface cards. Each disk interface card supports a number of disks. The disk interface card may use error correction (Redundant Array of Independent Disks, or RAID) to correct for a failed disk. The present invention may employ any of the RAID structures, though RAID 3 is the best suited to imaging applications where the files to be stored and retrieved are large. The RAID 3 technique requires only a simple writing of data plus parity across several disks. Alternatively, the RAID structure may be external to the disk interface card and be a part of the disk structure.

The present invention provides for the organization of several disk interface elements into a modular structure such that the storage may have one or several such units. Data from the disk interfaces is routed over a backplane to a very simple workstation interface card. Data buffering is on the disk interface card, not on the workstation interface card.

Using 1–4 disk interface cards, a storage system may be constructed that supports several tens of workstation interfaces. From these interfaces, several hundred workstations can be supported with performance that is orders of magnitude greater than the performance of a workstation connected to a central file server over a FDDI (100 megabit per second) local area network (LAN), or a high perfomance LAN.

A modular structure for a working storage unit is provided by the present invention. The modular structure provides for a much less expensive storage unit than the previous working storage unit by simplifying the structure and eliminating a number of cards in the system. Furthermore, the complex element of the storage system has been moved to the distribution card that provides the interface between the disks and the backplane. There is only one distribution board in a small system and at most four distribution boards in a large system. The more numerous interface boards are very simple.

The backplane is used as a time division multiplex bus. By allocating a fixed time slot to transfers of one data block to one interface card, a high data rate to the card is guaranteed. The data rate may be reduced by throttling data transfers over the backplane. That is, an interface ready line to the backplane may be used to delay transmission of a data block from the distribution card until the next available time slot. This use of the backplane permits the use of a small buffer on the interface card, thus simplifying the interface card.

The interface card has a set of optical input/output lines. Only one of the set is active at one time. Control from the CPU determines which one of the I/O lines is to be used for any one transfer. The inclusion of the multiple optical interfaces on the interface board eliminates an outboard unit and permits nodes to be directly connected to the modular working storage unit.

The modular working storage unit is organized to support large or small files of data. The large files of data are stored across all of the modules of the modular working storage unit. Small files of data are stored on individual modules. Several small files of data may be transferred at the same time over the backplane using the backplane as a space division switch.

The elements that characterize the modular working storage unit are as follows. RAID 3 error correction is used for each disk module, and error correction is used on the distribution card. A double buffer is used on the distribution card that is large enough to support a large file segment. The modular working storage unit provides for parallel data transfer over the high speed backplane bus from the distribution cards to the interface cards. The modular working storage unit implements means for an interface card to inhibit a transfer of a block of data in its time slot when its buffers are not ready for another block of data. Multiple outputs from each interface card may be selected so that the card may be time shared across several connections. Control of data transfers are executed on the distribution card, making a special computer control interface card unnecessary. The modular working storage unit combines data from multiple modules in the interface card to support higher throughput. An alternative mode of operation may be used where each interface card accepts data from only one module and several interface cards share one time slot on the backplane bus, thus supporting many transfers of smaller files. Only a few of the complex distribution cards and many of the very simple interface cards are employed, making the modular working storage unit much less expensive. A modular structure is provided such that 1–4 or 8 disk modules may be used in the system, depending on the number of nodes that are to be supported, the required storage capacity, and the required data throughput.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
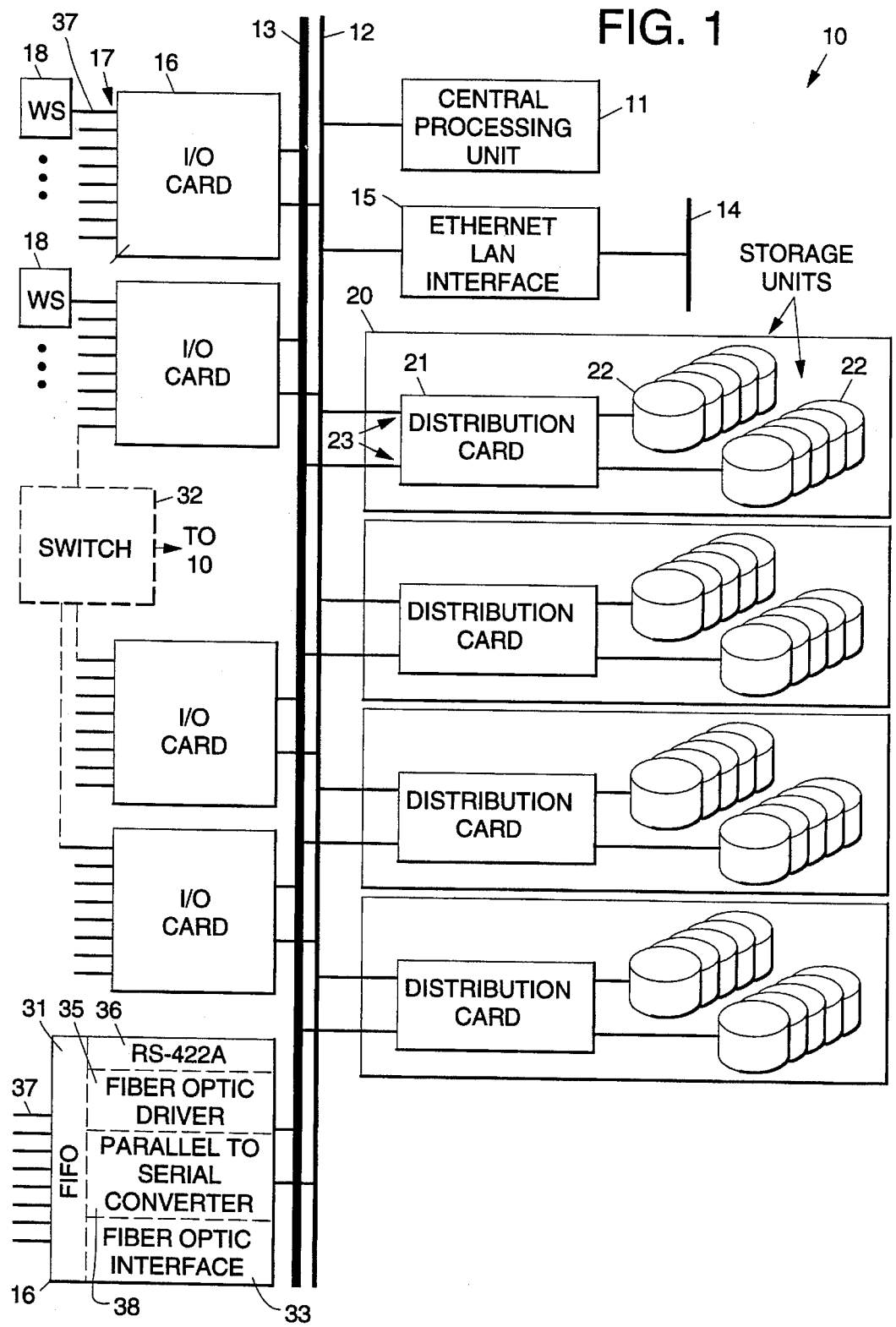
FIG. 1 is a block diagram of a modular working storage unit in accordance with the principles of the present invention.

Referring to the drawing figures, FIG. 1 is a block diagram of a modular working storage unit 10 in accordance with the principles of the present invention. The modular working storage unit 10 is comprised of a central processing unit 11 (CPU) that is coupled to a computer bus 12. An Ethernet local area network interface 15 is coupled between the computer bus 12 and a local area network (LAN) 14. A plurality of input/output cards 16 are coupled to the computer bus 12 and a high speed backplane bus 13. The plurality of input/output cards 16 have a plurality of input/output ports 17 that are respectively coupled to a plurality of user workstations (WS) 18. The plurality of input/output cards 16 include a direct fiber optic interface 33 with fan-out. Each input/output card 16 is a bidirectional I/O card having a small buffer 31 organized as a FIFO buffer 31.

A plurality of disk modules 20 are coupled to both the computer bus 12 and the high speed backplane bus 13. Each disk module 20 is comprised of a distribution card 21 that has a plurality of input/output ports 23 respectively coupled to the computer bus 12 and the high speed backplane bus 13. The distribution card 21 is coupled to a plurality of storage units 22, such as large capacity hard disks, for example.

Figure 2:
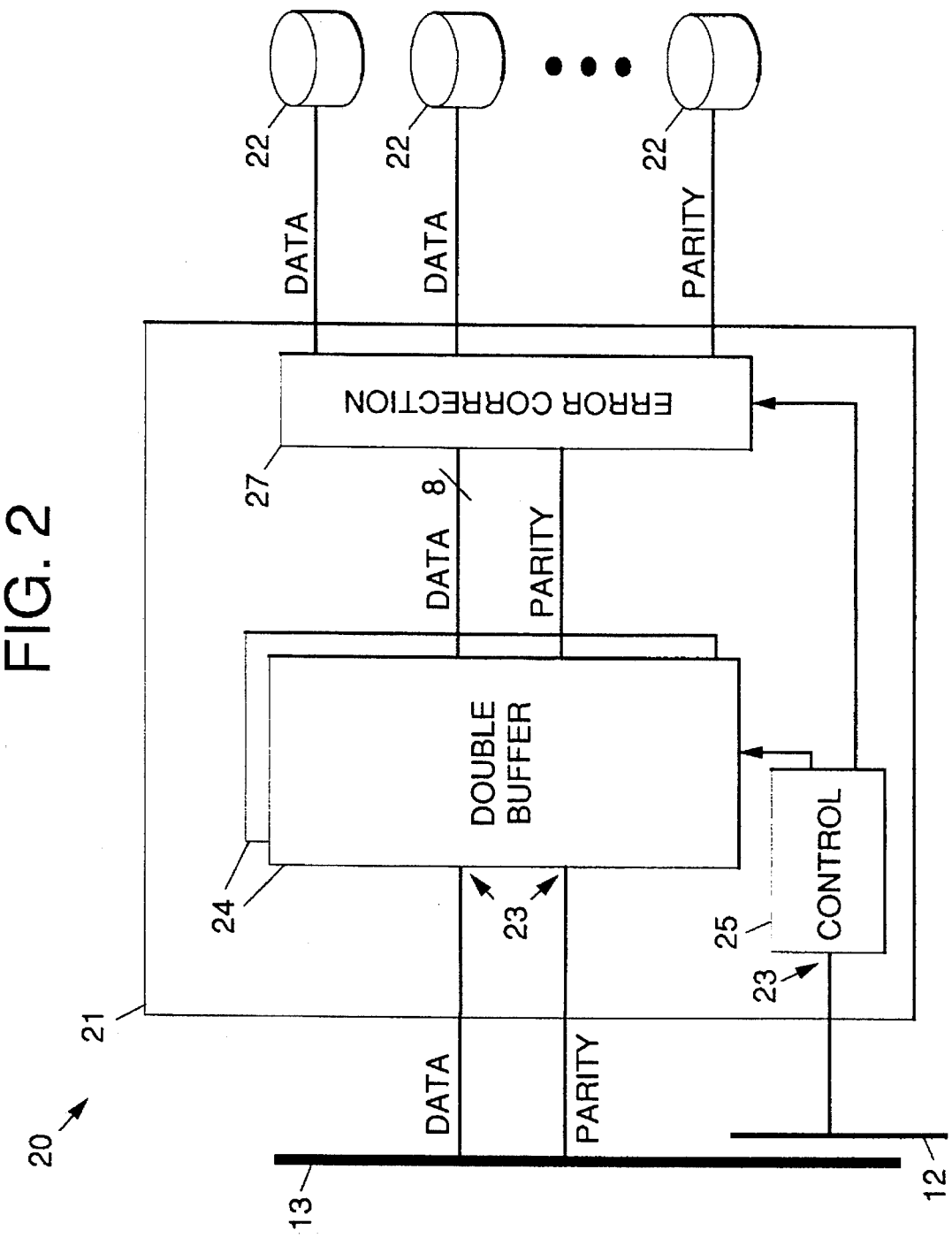
FIG. 2 is a block diagram of a distribution card employed in the modular working storage unit of FIG. 1.

Referring to FIG. 2, it shows a block diagram of the distribution card 21 employed in the modular working storage unit 10 of FIG. 1. The distribution card 21 is is comprised of a controller 25 that is coupled to the computer bus 12 through one of the input/output ports 23. The distribution card 21 includes a double buffer 24 that is coupled to the high speed backplane bus 13. The double buffer 24 is coupled to an error correction circuit 27 which in turn is coupled to the plurality of storage units 22. One of the storage units 22 is used to store parity bits (parity storage unit 22) while all other storage units 22 are used to store data.

Both data bits and parity bits are transferred from the plurality of storage units 22 to the plurality of user workstations 18, and vice versa. The error correction circuit 27 is adapted to process both the data bits and parity bits to determine the whether the data is error free. This will be described in more detail below.

The modular working storage unit 10 is an improvement over a previously developed working storage unit manufactured by the assignee of the present invention. The modular working storage unit 10 provides error correction and data buffering in the distribution cards 21, thus greatly simplifying the input/output cards 16. The input/output cards 16 are bidirectional, and the direct fiber optic interface 33 with fan-out is provided therein. The modular working storage unit 10 has certain functions moved to the distribution cards 21, including the interface between the storage units 22 and the high speed backplane 13. The modular working storage unit 10 has a more complicated distribution card 21 and therefore other cards are simpler or have been eliminated. In particular, further simplification has been accomplished by eliminating a computer interface card and a monitor card from the previous working storage unit.

Referring again to FIG. 2 it shows the structure of the distribution card 21. When writing data to the storage units 22, one to eight data bits are augmented by one parity bit, organized into sectors, and written to the storage units 22, one bit per storage unit 22. When reading the data, from the storage units 22, the data bits are collected from the storage units 22, and the parity is checked for an error. If there is no error the data is written into the double buffer 24 with parity. If there is an error, the data from the storage units 22 is examined by the error correction circuitry 27 to determine which of the storage units 22 had an error in the sector. The storage units 22 perform an error detection routine on each sector of the transferred data and provide a signal indicating that there is an error in the sector if an error is detected. When an error in a sector read from a particular storage unit 22 is detected, the parity bit is used to correct the data word. If there are two errors, the parity is correct, but signals are provided from the storage units 22 that there are two sectors from two different storage units 22 that have errors. The error correction circuitry 27 thus corrects single errors and detects multiple errors.

The error correction circuitry 27 implemented in the modular working storage unit 10 implements RAID 3 error correction. RAID is an acronym for a Redundant Array of Inexpensive Disks. RAID 3 uses error correction built-into the storage units 22. The parity is used to determine that there is an error and a signal from the parity storage unit 22 is used to indicate which sector has an error, and the data from the parity storage unit 22 is used to correct the data from the array of storage units 22.

High capacity memory chips (16 megabytes) are used to build the double buffer 24 on the distribution card 21, and which is made as large as one file segment for the data stored in the storage units 22. The size of the double buffer 24 is independent of the number of modules 20 in the modular working storage unit 10. A typical file segment may be 5 megabytes. The double buffer 24 provides for simultaneous data flow into and out of the buffer 24. A convenient size for the buffer 24 is 16 megabytes, comprising two buffers 24 of 8 megabytes each. A parity bit is added to each of the words of the buffer 24 so that errors introduced in the data are detected.

The I/O interface card 16 will now be described. The data from each module 20 is routed over the high speed backplane bus 13 to the interface card 16. Each interface card 16 is a bidirectional I/O card comprising the FIFO buffer 31. The FIFO buffer 31 accepts data from one or more of the disk modules 20 through the distribution card 21. The data is organized in the FIFO buffer 31 so that the multiple inputs provided data that forms one large word. The word is the size of the data from one module 20 if there is only one module 20, or is several times the size of the data from one module 20 if data is received from more than one module 20.

In one mode of operation, the data from all of the modules 20 is blocked together to form one large word. The one large word is reformatted to eight bit bytes for output from the I/O interface card 16. In another mode of operation, the data is retrieved from only one disk module 20. In this mode of operation, the FIFO buffer 31 on the interface card 16 is filled from the one source in bytes and the output is in bytes.

The data interface of the modular working storage unit 10 will now be described. The data interface of the I/O interface card 16 may be a copper byte wide parallel interface 36 such as a RS-422A interface 36. A preferred interface is an optical serial interface 33, such as the fiber optic interface 33. Byte wide parallel data may be passed through a parallel-to-serial converter 38 and routed to one of a number of fiber optic drivers 35 (eight drivers). Control of the I/O interface card 16 is exercised to select a particular driver that is turned on when there is data to be moved.

In order to accommodate transfer of data over long distances, a protocol is exercised involving a backward channel on a fiber 37. Using a standard protocol, the data is broken into packets. Each packet is transmitted down the fiber 37. An ack or nack response is expected for each packet of data. If the ack or nack has not been received after two packets have been sent, data transmission is suspended. If an ack for a packet is received, the transmission of the next packet in a sequence is enabled. If a nack for a packet is received, the transmission backs up to that packet and re-sends that packet and all the following packets. Using a packet size of several thousand bits and a delay of two packets, packet transmission distances of several miles are achieved.

Time division multiplexing on the high speed backplane bus 13 will now be described. The backplane 13 of the modular working storage unit 10 is operated in a time-division multiplexed mode. In the prior working storage unit the backplane was captured by a data transfer until a complete block of data was transferred to its interface card, since there was limited buffering on its distribution card. In the present modular working storage unit 10, the time during which data is transmitted on the backplane 13 is broken into time slots. Each transfer is allocated a time slot. The backplane 13 operates faster than the disk interface or the I/O interface 16, the backplane 13 supports more than one data transfer at a time. For a backplane 13 operating at 20 megabits per second, byte wide transfers from a disk module 20 support 20 megabytes per second. For four modules 20 the backplane rate is 80 megabytes per second. A typical I/O interface 16 supports 100 megabit s per second or 12.5 megabytes per second. The backplane transmits data during six time slots. In each time slot, 1000 bytes of data may be transferred, for example.

When there is one disk module 20, it supports one transfer at 100 megabit s per second at a time. A typical transfer rate for the storage unit 22 is 20 to 25 megabits per second per disk, or about 3 megabytes per second while the storage unit 22 is transferring data. Eight data storage units 22 support 24 megabytes per second per disk module 20. Since the storage unit 22 must seek a track containing the data and there is a rotational latency, the storage unit 22 do not transfer data all the time. The average data rate is therefore somewhat less than the full data rate, on the order of 12.5 megabytes per second. One disk module 20 thus corresponds to one data transfer at a time.

With one disk module 20, only one quarter of the backplane 13 is utilized. The data is transferred to the interface card 16 byte wide with parity. In this situation, all six of the time slots on the backplane 13 are allocated to the one transfer. The data rate through the interface card 16 is about 10% less than 20 megabytes per second, or about 144 megabits per second until the FIFO buffer 31 on the interface card 16 is filled. At this point the data flow over the backplane 13 is throttled by a not ready line until the data over the fiber optic interface 33 has moved enough bits to free an appropriate amount of space in the FIFO buffer 31 in the interface card 16.

With four disk modules 20, the data rate from the storage unit 22 is on the order of 50 megabytes per second. A full data block of 8 megabytes requires only 2 megabytes in the buffer 24 of any one distribution card 21, since the data is spread over four modules 20. It is convenient to divide the buffer 24 into segments. Six segments correspond to the six segments in the timing on the backplane. A data block may be loaded into each of the segments from the storage unit 22. Backplane multiplexing may then be used to transfer 32 bit wide words to the interface cards 16 at 20 megabits per second, a data rate of 640 megabits per second, or a full 80 megabytes per second. The transfer of 1000 bytes over the backplane 13 at this rate to fill the double buffer 24 proceeds very quickly and the backplane 13 is then used to transfer a 1000 byte block of data to a different interface card 16 from a different segment of the buffer 24.

Alternatively, the disk modules 20 may be operated independently. That is, the data from a single disk module 20 may be moved over a byte wide segment of the backplane 13 to one of the interface cards 16. Other disk modules 20 may move other data to other interface cards 16 at the same time over the segment of the backplane 13 allocated to those disk modules 20.

When higher data rates are required, the operation of the storage unit 22 in parallel provide the higher rates. When small data blocks are to be moved, the restriction of the data blocks to one disk module 20 provides more seeks per second and consequently higher performance.

The prefected method of operation with larger blocks is to operate all of the storage unit 22 in parallel. With this mode of operation the effect is to have six "servers" with access to the same collection of stored information on the storage unit 22. Restricting the data to single modules 20 changes the queuing structure to a single server queue. The six server queue may be loaded to more than 50% of capacity with little growth in queuing time. The single server queue system is restricted to less than about 30% of capacity for good performance.

The movement of data over the backplane 13 from the separate disk modules 20 need not be synchronous. The backplane 13 transfers can be one to four separate data transfers with little regard for skew and other phenomena that make multiple synchronous transfers troublesome. Passing the data through a FIFO buffer 31 at the input to the interface card 16 permits the data to be moved into the FIFO buffer 31 as a word wide transfer.

If the output of the modular working storage unit 10 is routed through a switch 32, an external node can have access to any of the interface cards 16. With this arrangement, any available interface card 16 may be used for connection to the storage unit 22. The switch 32 provides for switching out an interface card 16 in the event of a failure. More importantly, the switch 32 increases the avenues of access to the modular working storage unit 10. The node does not have to wait for a particular node to become free before access can be established. Waiting time for the modular working storage unit 10 thus decreases.

When a very large system uses a plurality of modular working storage units 10, the switch 32 provides for access to several working storage units 10. Each interface card 16 may have one of its outputs routed to a segment of the switch 32. Since there are eight (or more) outputs on each interface card, up to eight switch segments are supported. Even more switch segments may be supported if more interface cards 16 are used. There need not be more than 2–4 connections to any one segment of a switch 32 from one modular working storage unit 10. The switch 32 may be used with a single working storage unit 10 as well.

An alternative for the modular working storage unit 10 is to route data from one modular working storage unit 10 through a port to another modular working storage unit 10 and from there to a node. This scheme eliminates the switch 32 at some cost in performance, since the data must flow through two modular working storage units 10 with consequent delays.

Thus there has been described a new and improved image storage and distribution apparatus for use in storing and distributing large image data files that require special handling to provide for high performance. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. Image storage and distribution apparatus comprising:

a computer bus;

a high speed backplane bus;

a local area network;

a central processing unit coupled to the computer bus;

an Ethernet local area network interface coupled between the computer bus and the local area network;

a plurality of bidirectional input/output interface cards coupled to the computer bus and the high speed backplane bus that each comprise a plurality of bidirectional input/output ports that are respectively coupled to a plurality of user workstations, a fiber optic interface, and a FIFO buffer; and a plurality of disk modules coupled to the computer bus and the high speed backplane bus, that each comprise:
a plurality of storage units, one of which provides for movement of parity bits and the remainder of which provides for movement of data; and
a distribution card coupled to the plurality of storage units that comprises a plurality of input/output ports, a controller coupled to the computer bus through a first input/output port, a double buffer coupled to the high speed backplane bus through a second input/output port, and an error correction circuit coupled between the double buffer and the plurality of storage units.

2. The apparatus of claim 1 wherein the error correction circuit comprises RAID 3 error correction circuitry.

3. The apparatus of claim 1 wherein the double buffer has a size that is large enough to support a predetermined large file segment.

4. The apparatus of claim 1 wherein a parallel data transfer protocol is employed to transfer data over the high speed backplane bus between the distribution cards and the plurality of bidirectional input/output interface cards.

5. The apparatus of claim 1 which further comprises a switch coupled to each of the interface cards that permits coupling of a plurality of modular working storage units.

6. The apparatus of claim 1 wherein the controller comprises means for inhibiting transfer of a block of data in its time slot when the double buffer is full.

7. The apparatus of claim 1 wherein multiple outputs of each of the plurality of bidirectional input/output interface cards are selectable so that the card is time shared.

8. The apparatus of claim 1 wherein the controller controls the transfer of data to the computer bus.

9. The apparatus of claim 1 wherein the interface cards are configurable to combine data from multiple disk modules to support higher throughput.

10. The apparatus of claim 1 wherein each of the plurality of bidirectional input/output interface cards accepts data from only one disk module and several of the plurality of bidirectional input/output interface cards share one time slot on the backplane bus to support transfer of smaller files.

* * * * *